(12) United States Patent
Erdogan et al.

(10) Patent No.: US 7,411,679 B2
(45) Date of Patent: Aug. 12, 2008

(54) OPTICAL FILTER AND FLUORESCENCE SPECTROSCOPY SYSTEM INCORPORATING THE SAME

(75) Inventors: Turan Erdogan, Spencerport, NY (US); Ligang Wang, Rochester, NY (US); Glenn Clarke, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 248 days.

(21) Appl. No.: 10/953,483

(22) Filed: Sep. 29, 2004

(65) Prior Publication Data
US 2005/0110999 A1 May 26, 2005

Related U.S. Application Data

(63) Continuation-in-part of application No. 10/299,208, filed on Nov. 19, 2002, now Pat. No. 6,809,859.

(60) Provisional application No. 60/400,025, filed on Jul. 31, 2002.

(51) Int. Cl.
*G01N 21/25* (2006.01)
(52) U.S. Cl. .................................... 356/417
(58) Field of Classification Search .................. 356/417
See application file for complete search history.

(56) References Cited

U.S. PATENT DOCUMENTS

| 3,579,130 | A |   | 5/1971 | Smiley | 330/4.3 |
| 3,682,528 | A |   | 8/1972 | Apfel et al. | 350/1 |
| 4,081,763 | A |   | 3/1978 | Vlasenko et al. | 331/94.5 H |
| 5,291,332 | A |   | 3/1994 | Siebert | 359/589 |
| 5,337,191 | A | * | 8/1994 | Austin | 359/885 |
| 5,463,494 | A |   | 10/1995 | Hobrock | 359/359 |
| 6,717,965 | B2 | * | 4/2004 | Hopkins et al. | 372/20 |
| 6,809,859 | B2 | * | 10/2004 | Erdogan et al. | 359/359 |
| 6,859,483 | B1 | * | 2/2005 | Boucher et al. | 372/92 |
| 2003/0012230 | A1 | * | 1/2003 | Hopkins et al. | 372/20 |

FOREIGN PATENT DOCUMENTS

| JP | 61-133660 | 6/1986 |
| KR | 2002-92415 | 12/2002 |

OTHER PUBLICATIONS

Notice to Submit a Response for Korean patent application No. 10-2003-0079903 mailed on Aug. 17, 2005.
"BrightLine-Zero Fluorescence Filter Sets" data sheet (2 pages), Semrock, Inc., Oct. 20, 2003.
"Bandpass Filters for Ultraviolet and Visible Applications" data sheet (7 pages), Optical Coating Laboratory, Inc., 2003.
"Image Registered, Sub-Pixel Resolution Filter Sets" white paper (5 pages), Michael Stanley, Jan. 2005.
"Optical Filters Yield System Gains", Herman Chui, Biophotonics International, Mar. 2005 (4 pages).

* cited by examiner

*Primary Examiner*—Roy M Punnoose
(74) *Attorney, Agent, or Firm*—Finnegan, Henderson, Farabow, Garrett & Dunner LLP

(57) ABSTRACT

An optical filter including at least one substrate and first and second thin-film interference filters disposed directly on the substrate. The interference filters include a plurality of hard coating thin film layers of alternating high and low index of refraction. A filter set capable of providing low image shift is also provided.

33 Claims, 10 Drawing Sheets

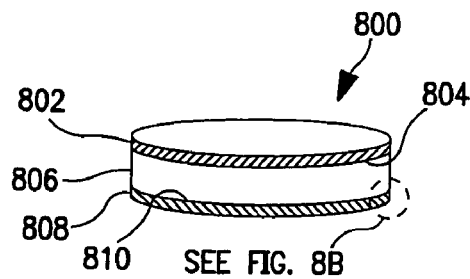 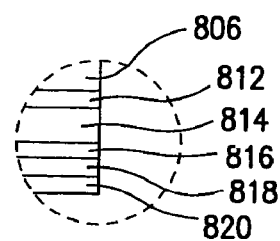
FIG. 8A   FIG. 8B
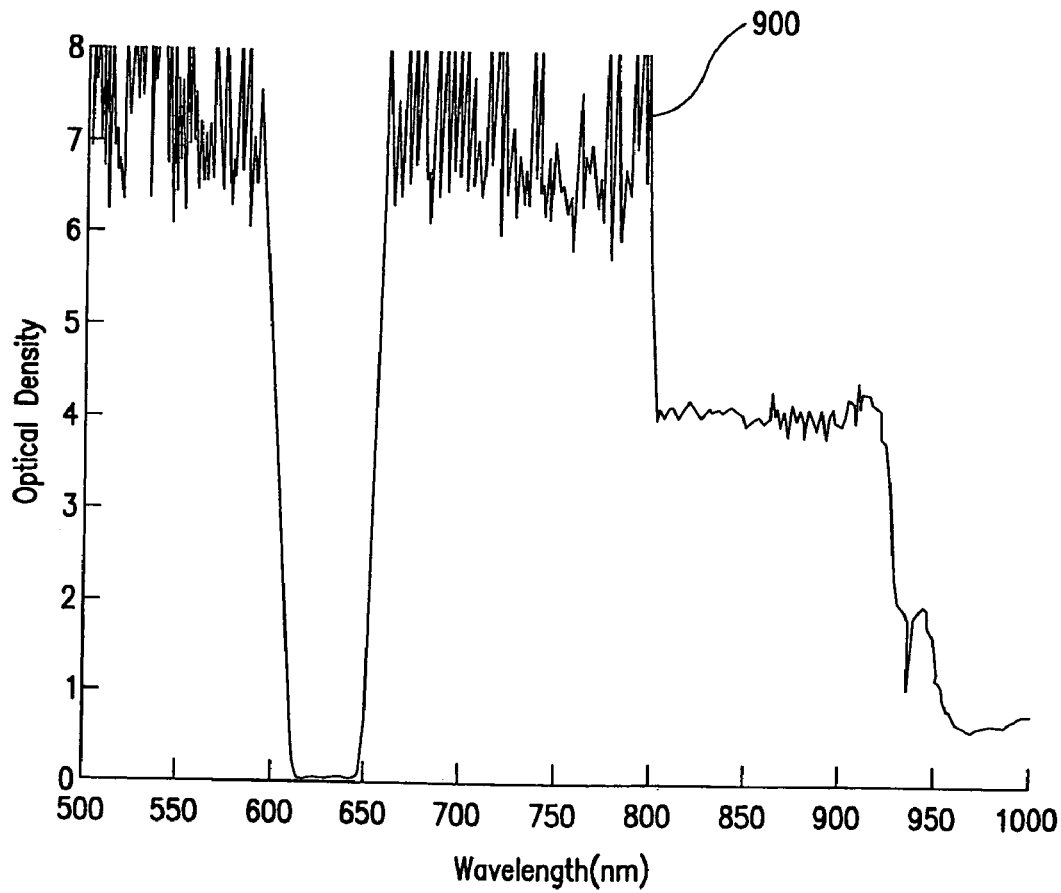
FIG. 9

OPTICAL FILTER AND FLUORESCENCE SPECTROSCOPY SYSTEM INCORPORATING THE SAME

CROSS REFERENCE TO RELATED APPLICATIONS

The present application is a continuation-in-part of U.S. patent application Ser. No. 10/299,208 filed Nov. 19, 2002, now U.S. Pat. No. 6,809,859 which claims the benefit of the filing date of U.S. Provisional Application No. 60/400,025, filed Jul. 31, 2002, the teachings of which are incorporated herein by reference.

FIELD

The present invention relates in general to optical filters, and in particular to thin film interference filters.

BACKGROUND

Thin film interference filters are widely used in a variety of optical systems. Such filters are generally implemented in an optical system for reflecting one or more spectral bands of an optical signal, while transmitting others. The reflected or transmitted range, for example, may include wavelengths carrying information sensed or transmitted by the system. Failure or inadequate performance of these filters can thus be fatal to operation of a system in which they are utilized.

Interference filters are wavelength-selective by virtue of the interference effects that take place between incident and reflected waves at boundaries between materials having different indices of refraction. Typically, an interference filter includes multiple layers of two or more dielectric materials having different refractive indices. Each layer is very thin, i.e. having an optical thickness (physical thickness times the refractive index of the layer) on the order of order of ¼ wavelength of light. The layers may be deposited on one or more substrates, e.g. a glass substrate, in various configurations to provide long-wave-pass (also called long-pass), short-wave-pass (also called short-pass), band-pass, or band-rejection filter characteristics.

Conventionally, the thin film layers in very high spectral performance interference filters for use at wavelengths below about 1200 nm have been implemented using "soft coatings." Soft coatings are typically deposited on a substrate using physical vapor deposition methods such as resistive evaporation and electron-beam evaporation. In these deposition methods, the selected coating material is vaporized, forming a cloud or stream that is imparted to the substrate. Conventional soft coating materials include metals like aluminum (Al) and silver (Ag), and dielectrics like lead fluoride ($PbF_2$), zinc sulfide (ZnS), and cryolite ($Na_5Al_3F_{14}$). The vaporized material solidifies on the substrate forming a thin film layer having a density and structure commensurate with the level of energy carried by the vaporized particles.

A major disadvantage associated with soft coatings is that, as the name implies, the coatings are physically soft and susceptible to damage and deterioration in most operating environments. In fact, soft coatings may be easily scratched when contacted by glass, metal, or even plastic. As such, these coatings must be protected from the environment when used in high performance applications, such as fluorescence detection systems, optical communication systems, etc. Also, because they are not very dense, they absorb moisture from the air, which causes their spectral properties to shift and can lead to longer term permanent degradation.

High performance soft coatings are, therefore, usually partially or fully hermetically sealed from the environment by placing them on the inside facing surfaces of two or more pieces of glass in a sealed ring housing, or they are sandwiched between glass substrates cemented together with optical adhesives, thus providing a barrier to moisture. FIG. 1 illustrates an exemplary prior art interference filter structure 100 including soft coating filters 102, 104 sandwiched between glass substrates 106, 108. The illustrated construction is a bandpass filter including a long-wave-pass filter 102 deposited on a first substrate 106 and affixed to the second substrate 108 via an adhesive layer 110. A short-wave-pass filter 104 is deposited on an opposing surface of the second substrate 108 and is affixed to a colored glass layer 112 by an adhesive layer 114. In addition to the effort and expense of hermetically sealing these soft coating filters, the additional substrates and optical adhesives used for such configurations lead to added loss (e.g. due to scattering and absorption) and manufacturing complexity (resulting in increased time and cost to manufacture). Another contributor to the manufacturing complexity is that in order to minimize losses associated with the additional surfaces resulting from multiple pieces of glass, additional anti-reflection (AR) coatings must be applied to these surfaces. Because of the increased cost and time required to apply additional coatings, these are often ignored; hence there is a trade-off between manufacturing complexity and filter throughput performance. Furthermore, the excess thickness associated with the hermetic seal makes it impractical for such filters to be diced into very small (e.g., millimeter-sized) filter "chips."

In order to minimize deviation of a light beam passing through the filter construction in an imaging application, as in an optical microscope, the overall construction should have a minimal wedge angle. However, when two or more pieces of glass are cemented together, it is difficult to ensure parallelism of the interfaces and hence minimal overall wedge angle. The difficulty minimizing the wedge angle in conventional filters may cause an undesirable phenomenon known as image shift. In an optical system, such as a fluorescence imaging system as shown in FIG. 16, image shift may occur when two or more different images, each captured with a different filter set, are shifted relative to one another in the plane of the camera film, Charge Coupled Device (CCD) sensor, or other detection system, due to non-zero beam deviation caused by the emitter filters and/or dichroic beamsplitters. The exciter filter does not generally contribute appreciably to this problem. In high-performance fluorescence imaging systems (such as fluorescence microscopes) that use optical filters (e.g., emission filters, excitation filters and dichroic filters), the filters may be placed in a region of the optical system where the imaging rays are substantially collimated or parallel. Therefore, a non-zero beam deviation caused by the emitter or dichroic filters causes the image in the image plane to be displaced laterally, which is problematic. In many fluorescence experiments, it is desirable to capture multiple images of a single object marked with multiple colors of fluorescent material using a monochrome camera. Each image depicts a single color and the images are subsequently combined electronically. If there is a relative image shift among the images, the final composite image will be blurred due to the relative lateral shift of the different color components.

As shown in FIG. 17, a conventional filter based on soft coatings is comprised of multiple glass substrates bonded together with epoxy. Thus, it is difficult to control the overall parallelism of the structure and the resulting net wedge angle causes appreciable beam deviation.

Based on the above considerations, options for minimizing image, or pixel, shift have been limited. One could measure each filter and hand-select only those with the smallest beam deviation; however, the yield with this approach is low because of the difficulty controlling the beam deviation. One could rotate the orientation of the emitter filter to best offset the beam deviation of the dichroic beamsplitter; however, this approach only works well when each filter in the pair has a similar magnitude of beam deviation, and it requires the extra manufacturing steps of measuring, orienting, and marking the finished filters. One could measure the net beam deviation (and orientation) of the emitter-dichroic pair, and then add an appropriately oriented compensating wedge of the appropriate wedge angle to cancel the net beam deviation. This technique works but is expensive and time-consuming to implement and adds additional optical surfaces that can contribute to light loss in the system.

Accordingly, there is a need for filters of sufficiently low beam deviation that minimize the wedge angle and the resulting image shift and that are relatively simple to manufacture.

SUMMARY

Consistent with one aspect of the invention, there is provided an emission filter for use in a spectroscopy system comprising a beamsplitter having a wedge angle $\alpha_{Di}$. The emission filter may have a wedge angle $\alpha_{Em}$ in accordance with the equation $0.072\alpha_{Em}+0.12\alpha_{Di}<\pm1$ pixel. The emission filter may include a substrate, a first thin-film interference filter disposed directly on a first surface of the substrate, and a second thin-film interference filter deposited directly on a second surface of the substrate opposed to the first surface. The first thin-film interference filter includes a first plurality of hard coating thin film layers of alternating high and low index of refraction and is configured for transmitting a first range of wavelengths. The second interference filter includes a second plurality of hard coating thin film layers of alternating high and low index of refraction and is configured for transmitting a second range of wavelengths different from the first range of wavelengths. The first and second thin-film interference filters thereby establish a bandpass characteristic for the optical filter for transmitting the band of wavelengths.

Consistent with another aspect of the invention, there is provided a spectroscopy system including a source of light for illuminating a sample; a detector for receiving light transmitted by the sample and for detecting an image of the sample; and a plurality of filter sets including at least an emission filter for filtering the light transmitted from the sample to the detector. Each of the filters in the filter sets has a predetermined wedge angle such that a relative pixel shift in the detector when changing from one of the filter sets to another of the filter sets is less than about ±1 pixel.

Consistent with a further aspect of the invention there is provided a fluorescence spectroscopy system including: a source of light for illuminating a sample under test with an excitation band of wavelengths; and an emission filter for selecting an emission band of wavelengths from a fluorescence signal transmitted by the sample under test in response to illumination by the excitation band of wavelengths. The emission filter may include a substrate, a first thin-film interference filter disposed directly on a first surface of the substrate, and a second thin-film interference filter deposited directly on a second surface of the substrate opposed to the first surface. The first thin-film interference filter includes a first plurality of hard coating thin film layers of alternating high and low index of refraction and is configured for transmitting a first range of wavelengths. The second interference filter includes a second plurality of hard coating thin film layers of alternating high and low index of refraction and is configured for transmitting a second range of wavelengths different from the first range of wavelengths. The first and second thin-film interference filters thereby establish a bandpass characteristic for the optical filter for transmitting the band of wavelengths.

A method of selecting a band of wavelengths from light in a fluorescence spectroscopy system consistent with the invention includes: providing an optical filter and imparting the light on the optical filter. The optical filter includes a substrate, a first thin-film interference filter disposed directly on a first surface of the substrate, and a second thin-film interference filter deposited directly on a second surface of the substrate opposed to the first surface. The first thin-film interference filter includes a first plurality of hard coating thin film layers of alternating high and low index of refraction and is configured for transmitting a first range of wavelengths. The second interference filter includes a second plurality of hard coating thin film layers of alternating high and low index of refraction and is configured for transmitting a second range of wavelengths different from the first range of wavelengths. The first and second thin-film interference filters thereby establish a bandpass characteristic for the optical filter for transmitting the band of wavelengths.

Consistent with yet another aspect of the present invention, there is provided an optical filter including: a substrate; and a first thin-film interference filter disposed directly on a first surface of the substrate, and a second thin-film interference filter disposed on a second surface of the substrate. The first interference filter is configured for transmitting a first range of wavelengths and includes at least 30 hard coating non-quarter wave first filter layers of alternating high and low index of refraction, whereby there is no wavelength in the first range of wavelengths for which the at least 30 hard coating non-quarter wave first filter layers is one-quarter of a wavelength in thickness. The second interference filter is configured for transmitting a second range of wavelengths and includes at least 30 hard coating non-quarter wave second filter layers of alternating high and low index of refraction, whereby there is no wavelength in the second range of wavelengths for which the at least 30 hard coating non-quarter wave second filter layers is one-quarter of a wavelength in thickness.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 8A: is a schematic illustration of another embodiment of a thin-film filter consistent with the invention;

FIG. 8B: is a detailed schematic illustration of a portion of the filter illustrated in FIG. 8A showing extended blocking.

FIG. 9: illustrates a transmittance v. wavelength spectrum for exemplary filter including extended blocking as illustrated in FIG. 8A and FIG. 8B;

DETAILED DESCRIPTION

Figure 1:
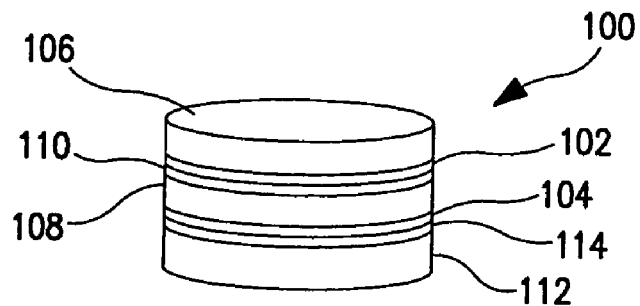
FIG. 1: is a schematic illustration of a prior art thin-film filter.
Figure 2:
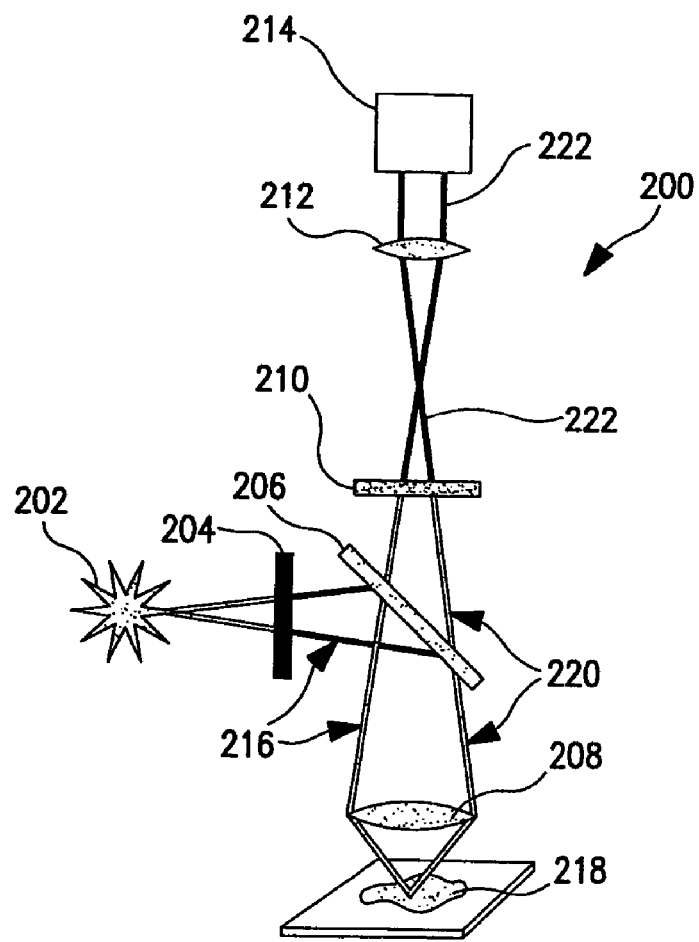
FIG. 2: is diagrammatic illustration of an exemplary fluorescence spectroscopy system consistent with the invention.

Turning now to FIG. 2, there is illustrated, in diagrammatic form, a fluorescence spectroscopy system 200 including thin film interference filters consistent with the invention. Although embodiments of the invention are described herein in connection with a particular application, it is to be understood that filters consistent with the invention may be used in a wide variety in optical systems and components. In fact, such filters have utility in any system wherein selective filtering of one or more particular wavelengths or bands of such wavelengths is desired.

As will be recognized by those skilled in the art, fluorescence spectroscopy may be used for molecular tracing, wherein a biological sample is tagged with a suitable fluorescent dye, i.e. a fluorophore. The dye fluoresces over a characteristic band of wavelengths in response to illumination by an appropriate excitation wavelength or band of wavelengths. The characteristic fluorescence of the dye is then detected by eye, camera (for fluorescence imaging) or by a sensitive detector. Fluorescence spectroscopy has a variety of applications including drug discovery, chemical analysis, DNA and RNA nucleotide sequencing, toxicology, blood analysis, etc.

Those skilled in the art will recognize that, for ease of explanation, the system 200 has been depicted in a simplified form for ease of explanation. As shown, the exemplary system 200 generally includes: a light source 202 (e.g. a source of broadband incoherent light, a coherent light source, e.g. a laser source, etc.), an excitation filter 204, a beam splitter 206, a first imaging lens 208, an emission filter 210, a second imaging lens 212, and a detector 214. In operation, the excitation filter 204 transmits a narrow illumination band 216 from the broadband light source 202.

This illumination band 216 is reflected by the beam splitter 206 to the first lens 208, which directs the illumination band onto the sample 218 under inspection. The fluorophore in the sample fluoresces under illumination by the illumination band 216 and generates a fluorescence signal 220. The fluorescence signal 220 is transmitted through the lens 208 and the beam splitter 206 and is imparted on the emission filter 210. The emission filter 210 is configured to isolate an emission band 222 of wavelengths corresponding to the known fluorescence wavelengths of the fluorophore from the fluorescence signal. The emission band 222 is transmitted to the second imaging lens 212, which directs the emission band 222 to the detector 214 for detection. The illumination 216 and emission bands 222 may each be a narrow band of wavelengths within a range from about 150 nm to 1200 nm. Typically, however, the illumination and emission bands are between about 400 nm and 700 nm.

Figure 3:
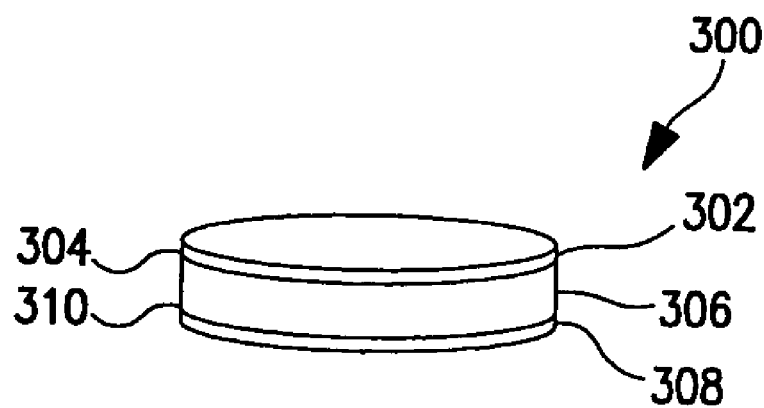
FIG. 3: is a schematic illustration of a thin-film filter consistent with the invention.

To facilitate accurate and reliable detection of the fluorescence signal, the excitation and emission filters may be configured as thin-film interference filters in a manner consistent with the present invention. FIG. 3 schematically illustrates one embodiment 300 of such a thin-film filter. Again, although a filter consistent with the invention has particular utility as an emission or excitation filter in a fluorescence spectroscopy system, e.g. in system 200, such filters have utility in a wide variety of optical systems. Also, as will be described in detail below, the illustrated exemplary embodiment exhibits bandpass characteristics. It should be understood, however, that the principles of the invention may be incorporated into a wide variety of filter spectral performance configurations.

Figure 4:
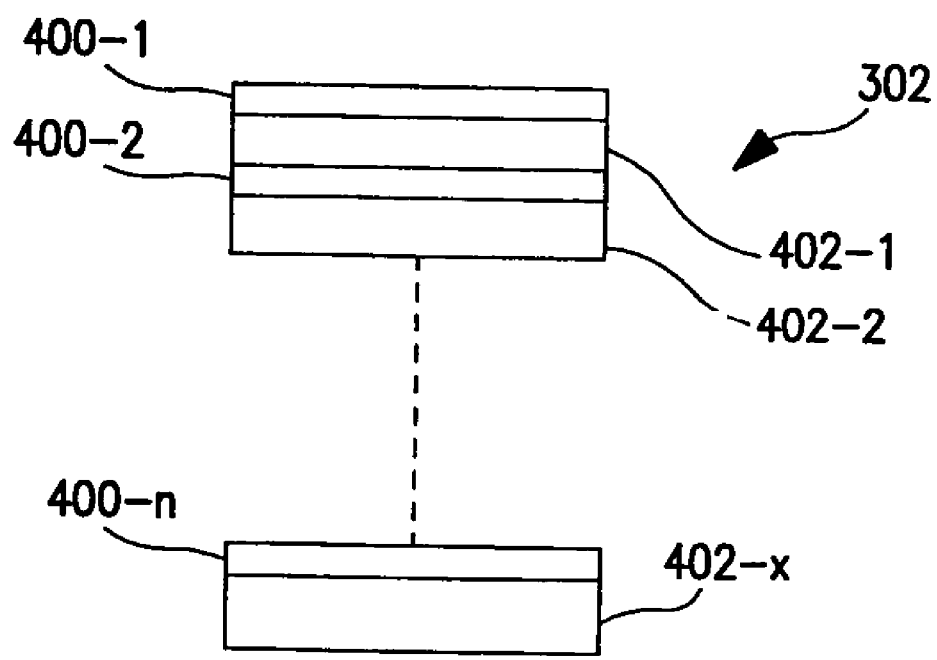
FIG. 4: is a schematic illustration of alternating layers of high and low index of refraction material for an interference filter portion of the filter illustrated in FIG. 3.

The exemplary embodiment 300 illustrated in FIG. 3 includes a long-wave-pass filter 302 deposited directly on a first surface 304 of a colored glass substrate 306 and a short-wave-pass filter 308 deposited directly on a second surface 310 of the colored glass substrate. Advantageously, the filters 302 and 308 are each formed from "hard coatings." With reference also to FIG. 4, for example, the long-wave-pass filter 302 may be formed by depositing alternating hard coating layers of high 400-1, 400-2 . . . 400-n and low. 402-1, 402-2 . . . 402-x index of refraction material. It is to be understood that the short-wave-pass filter will have a similar construction, i.e. alternating high and low index hard coating layers. The colored glass substrate absorbs light at wavelengths well removed from the bandpass region or filter edges, and is used to extend the spectral region of high blocking (high optical density) if desired; for example, the colored glass might absorb UV wavelengths, or IR wavelengths, or both. Such substrates are commercially available from such vendors as Schott Glass Corp.

In a preferred embodiment, the hard coating layers are deposited using ion-assisted ion beam sputtering. In order to reproducibly make filters with hard coating layers, given that the deposition rate in most deposition systems may vary with time, it is useful to use an optical monitoring technique. However, in ion-beam sputtering systems the deposition rate can be remarkably stable, and therefore when such a machine is running well, the hard coating layers may be deposited by calculating the thickness desired for each layer, assuming a deposition rate for each material, and then using the resulting deposition time to determine when to cut each layer (a "timing" technique). Those skilled in the art will recognize, however, that other deposition systems, such as ion-assisted electron beam evaporation and magnetron sputtering, may be used to deposit the layers. Also, a variety of "hard coating" materials that may be used as the high and low index of refraction layers will also be known to those skilled in the art. Exemplary hard coating materials include: $SiO_2$ (refractive index 1.5); TiO$_2$ (refractive index 2.4); Ta$_2$O$_5$ (refractive index 2.1); Nb$_2$O$_5$ (refractive index 2.2); and HfO$_2$ (refractive index about 2.0).

It is to be understood that the terms "high index of refraction" and "low index of refraction" are used herein to indicate a relative difference between the two layers of material (high and low), and, do not necessarily indicate a particular range of indexes. Thus, each high index of refraction layer need only have an index of refraction which is numerically higher than the low index of refraction layer adjacent thereto. The numerical differences between the index of refraction in the high and low index of refraction materials affects the number of layers required for forming a filter with a particular transmittance characteristic. Generally, a small difference between the indices of refraction in the high and low index materials, requires a higher number of alternating layers to achieve a particular transmittance (or optical density) than would be required with a larger difference.

Each of the layers 400-1, 400-2 . . . 400-n and low 402-1, 402-2 . . . 402-x has an associated optical thickness, defined by the product of its physical thickness times its refractive index. Although the embodiments shown in the drawings are not drawn to scale, the hard coating layers illustrated in FIG. 3 may be, for example, one quarter wavelength in optical thickness. Depending on desired transmission characteristics, however, non-quarter-wave optical thicknesses and/or varying optical thicknesses may also be provided.

Figure 5:
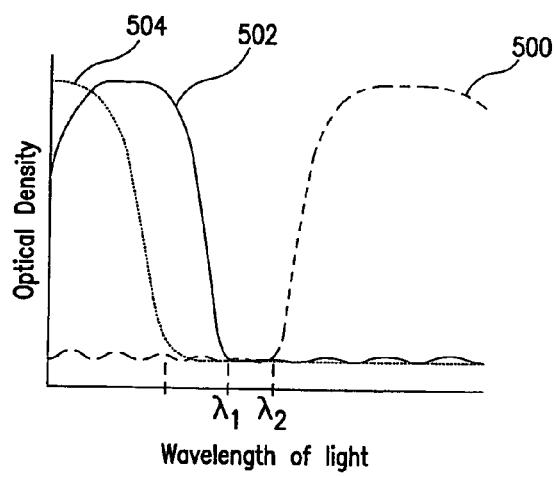
FIG. 5: illustrates optical density v. wavelength of the filter illustrated in FIG. 3.

FIG. 5 illustrates optical density vs. wavelength associated with the filter 300. In an application, such as fluorescence spectroscopy, wherein the filter is used with broadband light, i.e. highly incoherent light, the filters on opposite sides of the substrate can be viewed as non-interfering. That is, one need not be concerned with multi-path interference effects associated with light reflecting off of both filters 302, 308, but rather the net transmission T of light through two such filters can be determined from the individual transmission functions T$_1$ and T$_2$ as follows:

$$\frac{1}{T} = \frac{1}{T_1} + \frac{1}{T_2} - 1.$$

Since the optical density (OD) is defined to be minus the logarithm (base 10) of the transmission, or OD=$-\log_{10}$(T), then the net optical density for incoherent light passing through two such filters can be determined from the individual optical density functions OD$_1$ and OD$_2$ as follows:

$$OD = \log_{10}(10^{OD_1} + 10^{OD_2} - 1).$$

This result has important implications for the use of reflective filters for providing high optical density for blocking. The optical densities of multiple filters do not simply add together when the filters are reflective. If the filters actually extinguish the light, as is provided by absorbing glass filters, or when the filters can be sufficiently angled such that no reflected light contributes to the desired transmitted signal, then the net optical density of multiple filters can simply be taken to be the sum of the optical densities of the individual filters (equivalently, the net transmission is the product of the individual transmissions). Plot 500 thus illustrates optical density vs. wavelength associated with the short-wave-pass filter 308, plot 504 illustrates optical density vs. wavelength associated with the colored glass substrate 306, and plot 502 illustrates optical density vs. wavelength associated with the long-wave-pass filter 302.

As shown, the combined transmission characteristics of the filter components results in a passband between about $\lambda_1$ and $\lambda_2$. By appropriate selection of filter layer characteristics, the passband of the filter 300 may be configured to meet the wavelength selection requirements of the emission 210 and excitation 204 filters of a fluorescence spectroscopy system, e.g. system 200. Moreover, since the filter is formed using hard coatings, it is durable in the application and does not require hermetic sealing for protection against environmental influences.

Figure 6:
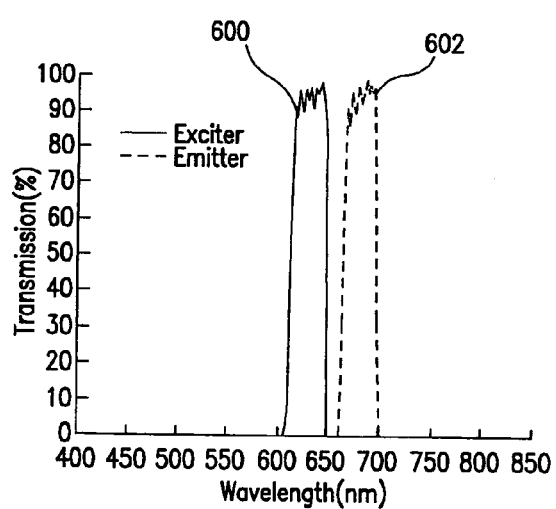
FIG. 6: illustrates a transmittance v. wavelength spectrum for exemplary excitation and emission filters consistent with the invention.
Figure 7:
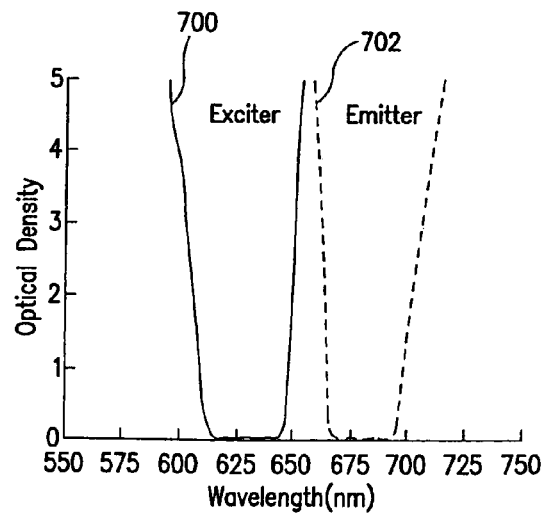
FIG. 7: illustrates optical density v. wavelength for the exemplary excitation and emission filters having the characteristics illustrated in FIG. 6.

FIG. 6, for example, illustrates a transmittance vs. wavelength spectrum for one exemplary embodiment of an emission 210 and excitation 204 filter constructed in a manner consistent with the invention. Plot 600 illustrates a transmittance vs. wavelength spectrum for the exemplary excitation filter 204, and plot 602 illustrates a transmittance vs. wavelength spectrum for the exemplary emission filter 210. FIG. 7 illustrates corresponding optical density (on a logarithm scale) vs. wavelength for the exemplary excitation 204 and emission 210 filters having the characteristic illustrated in FIG. 6. Plot 700 illustrates optical density vs. wavelength for the exemplary excitation filter 204, and plot 702 illustrates optical density vs. wavelength for the exemplary emission filter 210.

Exemplary filters consistent with the invention and having the characteristics illustrated in FIGS. 6 and 7 may be produced by depositing hard coating filter layers using a timing technique and an ion-assisted, ion-beam sputtering vacuum system. The filters may be deposited on a Schott OG-570 glass substrate, the low-index material may be silicon dioxide (SiO$_2$, index of about 1.5), and the high-index material may be tantalum pentoxide (Ta$_2$O$_5$, index of about 2.1). The layer structure for the long-wave pass (LWP) and short-wave pass (SWP) coatings of the exemplary emission and excitation filters is provided below in Table 1.

TABLE 1

| Excitation SWP | | Excitation LWP | | Emission LWP | | Emission SWP | |
|---|---|---|---|---|---|---|---|
| Material | Thickness (nm) | Material | Thickness (nm) | Material | Thickness (nm) | Material | Thickness (nm) |
| Substrate | — | Substrate | — | Substrate | — | Substrate | — |
| TA2O5 | 88.70 | TA2O5 | 67.05 | TA2O5 | 75.46 | TA2O5 | 87.81 |
| SIO2 | 327.62 | SIO2 | 90.61 | SIO2 | 104.83 | SIO2 | 128.99 |
| TA2O5 | 69.49 | TA2O5 | 57.42 | TA2O5 | 70.74 | TA2O5 | 112.98 |
| SIO2 | 163.79 | SIO2 | 74.6 | SIO2 | 88.57 | SIO2 | 142.96 |
| TA2O5 | 122.37 | TA2O5 | 57.54 | TA2O5 | 56.06 | TA2O5 | 96 |
| SIO2 | 70.10 | SIO2 | 86.82 | SIO2 | 82.81 | SIO2 | 127.05 |
| TA2O5 | 83.62 | TA2O5 | 65.09 | TA2O5 | 68.58 | TA2O5 | 89.56 |

TABLE 1-continued

| Excitation SWP | | Excitation LWP | | Emission LWP | | Emission SWP | |
|---|---|---|---|---|---|---|---|
| Material | Thickness (nm) | Material | Thickness (nm) | Material | Thickness (nm) | Material | Thickness (nm) |
| SIO2 | 105.17 | SIO2 | 93.01 | SIO2 | 101.6 | SIO2 | 125.75 |
| TA2O5 | 80.17 | TA2O5 | 65.5 | TA2O5 | 73.63 | TA2O5 | 92.39 |
| SIO2 | 126.60 | SIO2 | 93.22 | SIO2 | 104.83 | SIO2 | 130.09 |
| TA2O5 | 83.20 | TA2O5 | 64.73 | TA2O5 | 74.25 | TA2O5 | 93.04 |
| SIO2 | 90.64 | SIO2 | 91.12 | SIO2 | 104.6 | SIO2 | 131.24 |
| TA2O5 | 109.71 | TA2O5 | 63.05 | TA2O5 | 73.06 | TA2O5 | 97.97 |
| SIO2 | 157.09 | SIO2 | 88.36 | SIO2 | 101.47 | SIO2 | 132.16 |
| TA2O5 | 65.58 | TA2O5 | 62.51 | TA2O5 | 69.57 | TA2O5 | 93.03 |
| SIO2 | 119.24 | SIO2 | 87.87 | SIO2 | 90.91 | SIO2 | 129.34 |
| TA2O5 | 77.64 | TA2O5 | 63.22 | TA2O5 | 62.32 | TA2O5 | 92.2 |
| SIO2 | 125.90 | SIO2 | 89.78 | SIO2 | 88.86 | SIO2 | 127.05 |
| TA2O5 | 70.68 | TA2O5 | 64.04 | TA2O5 | 68.34 | TA2O5 | 89.86 |
| SIO2 | 122.57 | SIO2 | 91.34 | SIO2 | 100.15 | SIO2 | 126.4 |
| TA2O5 | 88.37 | TA2O5 | 64.68 | TA2O5 | 72.76 | TA2O5 | 91.93 |
| SIO2 | 119.87 | SIO2 | 91.82 | SIO2 | 104.21 | SIO2 | 131.52 |
| TA2O5 | 92.17 | TA2O5 | 64.54 | TA2O5 | 73.93 | TA2O5 | 92.21 |
| SIO2 | 132.35 | SIO2 | 91.42 | SIO2 | 104.84 | SIO2 | 130.08 |
| TA2O5 | 93.58 | TA2O5 | 63.7 | TA2O5 | 73.56 | TA2O5 | 94.89 |
| SIO2 | 94.95 | SIO2 | 90.71 | SIO2 | 103.29 | SIO2 | 134.31 |
| TA2O5 | 75.62 | TA2O5 | 64.01 | TA2O5 | 71.68 | TA2O5 | 93.77 |
| SIO2 | 127.44 | SIO2 | 90.19 | SIO2 | 97.37 | SIO2 | 128.35 |
| TA2O5 | 76.75 | TA2O5 | 64.1 | TA2O5 | 66.09 | TA2O5 | 90.62 |
| SIO2 | 126.32 | SIO2 | 89.72 | SIO2 | 88.43 | SIO2 | 129.45 |
| TA2O5 | 91.14 | TA2O5 | 63.68 | TA2O5 | 64.29 | TA2O5 | 88.46 |
| SIO2 | 128.81 | SIO2 | 89.57 | SIO2 | 94.57 | SIO2 | 126.17 |
| TA2O5 | 89.51 | TA2O5 | 63.47 | TA2O5 | 70.69 | TA2O5 | 90.46 |
| SIO2 | 118.91 | SIO2 | 90.13 | SIO2 | 102.18 | SIO2 | 127.42 |
| TA2O5 | 80.26 | TA2O5 | 63.81 | TA2O5 | 73.29 | TA2O5 | 94.6 |
| SIO2 | 115.27 | SIO2 | 90.99 | SIO2 | 104.66 | SIO2 | 138.54 |
| TA2O5 | 81.34 | TA2O5 | 64.22 | TA2O5 | 73.86 | TA2O5 | 93.73 |
| SIO2 | 119.37 | SIO2 | 91.84 | SIO2 | 104.49 | SIO2 | 131.61 |
| TA2O5 | 81.52 | TA2O5 | 64.91 | TA2O5 | 73.2 | TA2O5 | 93.45 |
| SIO2 | 117.64 | SIO2 | 91.98 | SIO2 | 101.87 | SIO2 | 125.99 |
| TA2O5 | 91.54 | TA2O5 | 64.83 | TA2O5 | 70.47 | TA2O5 | 89.89 |
| SIO2 | 129.34 | SIO2 | 90.93 | SIO2 | 94.63 | SIO2 | 126.66 |
| TA2O5 | 94.35 | TA2O5 | 63.99 | TA2O5 | 64.48 | TA2O5 | 89.6 |
| SIO2 | 120.18 | SIO2 | 88.58 | SIO2 | 88.34 | SIO2 | 126.57 |
| TA2O5 | 73.74 | TA2O5 | 62.09 | TA2O5 | 66.38 | TA2O5 | 93.13 |
| SIO2 | 115.06 | SIO2 | 87.1 | SIO2 | 97.69 | SIO2 | 130.03 |
| TA2O5 | 80.35 | TA2O5 | 62.06 | TA2O5 | 71.8 | TA2O5 | 96.69 |
| SIO2 | 119.04 | SIO2 | 89.45 | SIO2 | 102.95 | SIO2 | 136.07 |
| TA2O5 | 89.05 | TA2O5 | 64.24 | TA2O5 | 73.48 | TA2O5 | 95.5 |
| SIO2 | 123.67 | SIO2 | 92.62 | SIO2 | 104.52 | SIO2 | 130.35 |
| TA2O5 | 84.76 | TA2O5 | 65.76 | TA2O5 | 73.76 | TA2O5 | 92.37 |
| SIO2 | 119.67 | SIO2 | 94.04 | SIO2 | 103.92 | SIO2 | 126.09 |
| TA2O5 | 92.83 | TA2O5 | 66.39 | TA2O5 | 72.91 | TA2O5 | 89.3 |
| SIO2 | 121.87 | SIO2 | 92.18 | SIO2 | 100.77 | SIO2 | 124.34 |
| TA2O5 | 89.01 | TA2O5 | 63.16 | TA2O5 | 69.25 | TA2O5 | 90.87 |
| SIO2 | 106.79 | SIO2 | 78.9 | SIO2 | 91.85 | SIO2 | 135.11 |
| TA2O5 | 80.09 | TA2O5 | 51.93 | TA2O5 | 63.64 | TA2O5 | 102.87 |
| SIO2 | 104.67 | SIO2 | 79.51 | SIO2 | 90.28 | SIO2 | 160.43 |
| TA2O5 | 90.98 | TA2O5 | 63.35 | TA2O5 | 68.22 | TA2O5 | 92.87 |
| SIO2 | 128.95 | Air | — | SIO2 | 99.24 | Air | — |
| TA2O5 | 94.37 | | | TA2O5 | 72.25 | | |
| SIO2 | 112.13 | | | SIO2 | 103.31 | | |
| TA2O5 | 91.04 | | | TA2O5 | 73.68 | | |
| SIO2 | 115.83 | | | SIO2 | 104.53 | | |
| TA2O5 | 86.58 | | | TA2O5 | 73.75 | | |
| SIO2 | 116.83 | | | SIO2 | 103.79 | | |
| TA2O5 | 76.06 | | | TA2O5 | 72.35 | | |
| SIO2 | 111.05 | | | SIO2 | 99.33 | | |
| TA2O5 | 85.46 | | | TA2O5 | 67.72 | | |
| SIO2 | 126.64 | | | SIO2 | 89.1 | | |
| TA2O5 | 92.95 | | | TA2O5 | 63.35 | | |
| SIO2 | 131.93 | | | SIO2 | 92.19 | | |
| TA2O5 | 87.94 | | | TA2O5 | 69.7 | | |
| SIO2 | 112.33 | | | SIO2 | 101.56 | | |
| TA2O5 | 81.86 | | | TA2O5 | 73.12 | | |
| SIO2 | 110.22 | | | SIO2 | 104.37 | | |
| TA2O5 | 81.14 | | | TA2O5 | 74.04 | | |
| SIO2 | 121.15 | | | SIO2 | 104.68 | | |
| TA2O5 | 83.38 | | | TA2O5 | 73.58 | | |
| SIO2 | 124.77 | | | SIO2 | 102.67 | | |

TABLE 1-continued

| Excitation SWP | | Excitation LWP | | Emission LWP | | Emission SWP | |
|---|---|---|---|---|---|---|---|
| Material | Thickness (nm) | Material | Thickness (nm) | Material | Thickness (nm) | Material | Thickness (nm) |
| TA2O5 | 87.40 | | | TA2O5 | 71.04 | | |
| SIO2 | 125.51 | | | SIO2 | 95.27 | | |
| TA2O5 | 88.48 | | | TA2O5 | 64.03 | | |
| SIO2 | 123.62 | | | SIO2 | 86.48 | | |
| TA2O5 | 89.72 | | | TA2O5 | 65.43 | | |
| SIO2 | 116.72 | | | SIO2 | 97.15 | | |
| TA2O5 | 77.10 | | | TA2O5 | 71.88 | | |
| SIO2 | 114.06 | | | SIO2 | 103.51 | | |
| TA2O5 | 80.17 | | | TA2O5 | 73.95 | | |
| SIO2 | 126.44 | | | SIO2 | 105.21 | | |
| TA2O5 | 89.44 | | | TA2O5 | 74.29 | | |
| SIO2 | 127.03 | | | SIO2 | 104.39 | | |
| TA2O5 | 89.52 | | | TA2O5 | 72.75 | | |
| SIO2 | 133.73 | | | SIO2 | 96.87 | | |
| TA2O5 | 93.33 | | | TA2O5 | 61.27 | | |
| SIO2 | 137.12 | | | SIO2 | 74.36 | | |
| TA2O5 | 123.32 | | | TA2O5 | 62.69 | | |
| SIO2 | 163.47 | | | SIO2 | 98.91 | | |
| TA2O5 | 92.65 | | | TA2O5 | 73.81 | | |
| SIO2 | 129.26 | | | Air | — | | |
| TA2O5 | 95.12 | | | | | | |
| SIO2 | 134.73 | | | | | | |
| TA2O5 | 107.85 | | | | | | |
| SIO2 | 173.47 | | | | | | |
| TA2O5 | 98.22 | | | | | | |
| SIO2 | 140.92 | | | | | | |
| TA2O5 | 98.06 | | | | | | |
| SIO2 | 136.54 | | | | | | |
| TA2O5 | 98.82 | | | | | | |
| SIO2 | 136.22 | | | | | | |
| TA2O5 | 117.08 | | | | | | |
| SIO2 | 165.33 | | | | | | |
| TA2O5 | 94.36 | | | | | | |
| SIO2 | 135.37 | | | | | | |
| TA2O5 | 93.44 | | | | | | |
| SIO2 | 136.92 | | | | | | |
| TA2O5 | 105.13 | | | | | | |
| SIO2 | 167.91 | | | | | | |
| TA2O5 | 102.57 | | | | | | |
| SIO2 | 136.72 | | | | | | |
| TA2O5 | 99.16 | | | | | | |
| SIO2 | 144.93 | | | | | | |
| TA2O5 | 101.10 | | | | | | |
| Air | — | | | | | | |

As shown, the short-wavelength edge-filter (long-wave pass) coating of the excitation filter and the long-wavelength edge-filter (short-wave pass) coating of the emission filter may have roughly 59 non-quarter-wave-thick layers and a total thickness of roughly 5 µm. For the edges requiring the greatest steepness in the application, the long-wavelength edge-filter coating of the excitation filter and the short-wavelength edge-filter coating of the emission filter may have about 100 non-quarter-wave-thick layers and a total thickness of roughly 10 µm.

The term non-quarter wave as used herein with respect to layer thickness means that there is no wavelength transmitted by the filter for which the layer is one-quarter of the wavelength in thickness. A filter consistent with the invention may include quarter-wave and non-quarter wave layers, only quarter-wave layers, or only non-quarter wave layers. Advantageously, use of multiple non-quarter wave layers, e.g. 30 or more, allows for high performance filter characteristics.

As the designs in Table 1 demonstrate, long-wave-pass and short-wave-pass coatings may be based on the long-wavelength edge and the short-wavelength edge, respectively, of a "stopband" associated with a nominally "quarter-wave stack" of high-index and low-index layers. A "quarter-wave stack" is a stack of alternating high-index and low-index layers in which every layer is an integer multiple of one-quarter of a "material wavelength" thick for some particular center wavelength, where "material wavelength" is defined to be the vacuum wavelength divided by the index of refraction of the material. The "stopband" associated with this structure is the range of wavelengths around the center wavelength over which the filter is highly reflecting or non-transmitting. The transitions from the stopband to the transmitting regions on either side of the stopband form the long-wave-pass and short-wave-pass edge filters.

In order to reduce the transmission ripple in the transmitting regions, the actual structures may not be exactly quarter-wave stacks, but may instead be optimized by adjusting the layer thicknesses. The wavelengths at which most or all of the layers of the optimized structure are a quarter-wave thick lie within the stopband, or outside of the transmitting region of the filter. In contrast, most or all of the layers of a bandpass filter based on a multiple-cavity Fabry-Perot type structure, which is well known in the art, are an integer multiple of one-quarter of a wavelength thick at the center wavelength of the transmitting passband. Since there are few or no layers for the filters consistent with the invention for which the thickness is one quarter of a wavelength that lies within the transmitting passband, the filters consistent with the invention are comprised of "non-quarter-wave" layers, despite the fact that most or all of the layers are a quarter-wave thick for some wavelength within the stopband or non-transmitting region of the filter spectrum.

As will be described in greater detail below, extended blocking may be applied to the long-wavelength edge-filter (short-wave-pass) coatings of the excitation and emission filters, to bring the thickness of these filters to about 13 μm. Also, the filters may be deposited on 1" diameter substrates. Advantageously, therefore, the filters may be diced into much smaller filter "chips." In one embodiment, for example, the filters may be diced into 1.25 mm squares (1.2 mm thick).

Another advantage of a filter consistent with the invention is that it may be constructed to include no adhesive or air in the optical path. Adhesive can create difficulties in a filter construction. For example, the adhesive can deteriorate over time, thereby affecting filter performance, and can limit the ability to dice the filter into smaller filter "chips." Also, in fluorescence applications, the adhesive can auto-fluoresce generating undesirable system "noise" and affecting detection reliability. Since the hard coating filter layers may be deposited directly on a substrate in a filter consistent with the invention, no adhesive is required to join filter layers to the substrate, thereby obviating the need for adhesive in constructing the filter.

The exemplary excitation and emission filter constructions illustrated in FIGS. 6 and 7 exhibit transmission that exceeds 90% over the passband; edge slopes of below 1% of the wavelength per 5 decades of logarithm of transmission; and cut-point (edge-wavelength location) accuracies of better than ±0.5% of the edge wavelength. In addition, the filters provide a high degree of out-of-band blocking, e.g. on the order of OD greater than 6 for all wavelengths up to a wavelength that is about 150 nm longer than the longest filter edge wavelength. With extended blocking layers added (as used in the examples in FIGS. 6 and 7), the out-of-band blocking may be extended to wavelengths up to about 1200 nm Also, although for this example the blocking comprises only about OD>4, OD>6 or higher could be obtained by additional layers. The blocking range may also be extended to wavelengths of about 1200 nm or higher using colored glass that absorbs these longer wavelengths, although the transmission over the passband may be compromised.

This out-of-band blocking provides a significant advantage in fluorescence applications since it eliminates or substantially reduces fluorescence that originates in the glass of the filter construction itself. All fluorescence, except the fluorescence that comes from the biological sample of interest, is considered "noise" and is undesirable. When a filter consistent with the invention is oriented so that light from the source is incident on the long-wave-pass filter first, the short-wave-pass filter blocks essentially all of this "noise" fluorescence from the rest of the system. Detection accuracy and reliability are thus improved. This is an inherent advantage of the present invention over the prior art, in which the need to sandwich the edge filter coatings between pieces of glass to protect them from the environment always allows for fluorescence from the outer-most piece of glass to contaminate the system and thus its measurement accuracy.

Turning now to FIGS. 8A and 8B, there is shown another embodiment 800 of a filter consistent with the invention. The filter includes a long-wave-pass filter 802 deposited directly on a first surface 804 of a substrate 806, e.g. colored glass, fused silica, etc., and a short-wave-pass filter 808 deposited directly on a second surface 810 of the colored glass layer. As shown in the detail view of FIG. 8B, the short-wave-pass filter 808 includes a first matching portion 812, a short-wave-pass thin-film portion 814, a second matching portion 816, a chirped Bragg reflector portion 818, and a third matching portion 820.

Each portion of the filter may be constructed from multiple hard coating layers. The short-wave-pass filter portion 814 may be configured to exhibit a characteristic similar to that of plot 500 in FIG. 5 for blocking longer wavelengths. Addition of the chirped Bragg reflector portion 818 to the side of the short-wave-pass filter portion 814 opposite to the substrate 806 provides extended blocking of longer wavelengths, depending on the selection of the Bragg reflector layers. Consistent with the invention, the Bragg reflector layers may be thin film hard coatings. Those skilled in the art will recognize that the chirped Bragg reflector portion may be formed by depositing the hard coatings with varying thickness to cause reflection of a range of wavelengths. The matching portions 812, 816, and 820 may be provided to offset or minimize destructive interference of wavelengths reflected by adjacent portions in the filter. Such interference can result in partial cancellation of some wavelengths at the boundaries of the passbands associated with adjacent layers, thus causing "holes" or dips at certain points in the optical density vs. wavelength curve. The matching portions may be thin-film reflectors including multiple hard coating layers of alternating high and low index of refraction material. It should be noted that the construction in FIG. 8B is a representation of the approach used to provide both the short-wave pass and extended blocking functions in one coating. In practice, the final structure may be optimized in such a way that the layer thicknesses differ somewhat from the starting values that are separately optimized for stand-alone short-wave pass and extended-blocking coatings.

The addition of the chirped Bragg reflector portion 818 provides extended blocking, and can obviate the need for a colored glass substrate which provides additional absorption bands for blocking light over unwanted wavelengths. FIG. 9, for example, provides a plot 900 of optical density vs. wavelength for the exemplary filter constructed as described above with respect to FIGS. 6 and 7, but having extended blocking as illustrated in FIGS. 8A and 8B. As shown, addition of the chirped Bragg reflector portion 818 extends the blocking of the filter to well beyond 800 nm. The rejection of optical density (OD) of about OD>6 from 650 to 800 nm results from the rejection band of the short-wave-pass filter portion 814. The rejection of just above OD=4 from 800-925 nm results from the extended, chirped Bragg reflector portion 818.

Figure 10:
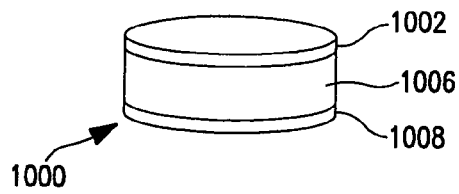
FIG. 10: is a schematic illustration of another embodiment of a thin-film filter consistent with the invention.

Those skilled in the art will recognize that a filter consistent with the invention may be provided in a variety of configurations. The invention is not limited to only long-wave-pass or short-wave-pass edge filter coatings as described above. FIG. 10, for example, illustrates another embodiment 1000 of a filter consistent with the invention. The filter 1000 includes a long-wave-pass filter 1002 deposited directly on a first surface of a transparent substrate 1006, and a short-wave-pass filter 1008 deposited directly on a second surface of the substrate 1006. In the illustrated embodiment 1000, however, extended blocking portions are provided on both the long-wave-pass and short-wave-pass filters. The extended blocking on each layer may be configured as a chirped Bragg reflector portion, as described above in connection with FIGS. 8A and 8B. Also, although the illustrated embodiment includes a single substrate, it is to be understood that any embodiment could be constructed by forming filters, e.g. the long-wave and short-wave-pass filters, on separate substrates with the substrates being subsequently joined.

Figure 11:
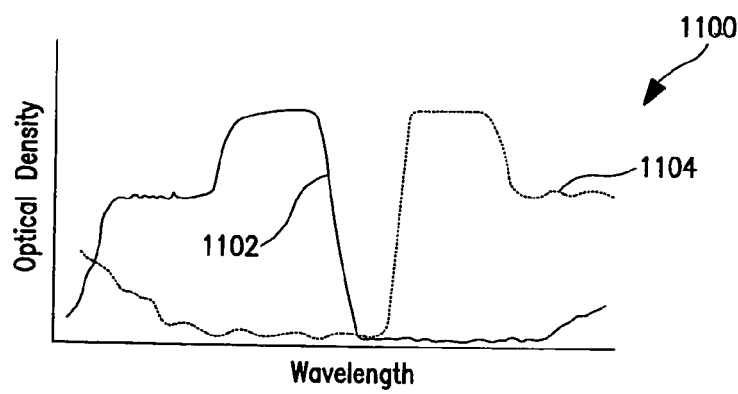
FIG. 11: illustrates optical density v. wavelength of the filter illustrated in FIG. 10.

FIG. 11 provides an illustration 1100 of optical density (on a logarithm scale) vs. wavelength for the filter 1000. Plot 1102 illustrates the optical density vs. wavelength for the long-wave-pass filter with extended blocking 1002, and plot 1104 illustrates optical density vs. wavelength for the short-wave-pass filter with extended blocking 1008. As shown, this configuration allows for high out-of-band rejection for both long and short wavelengths that are not of interest in the application.

Figure 12:
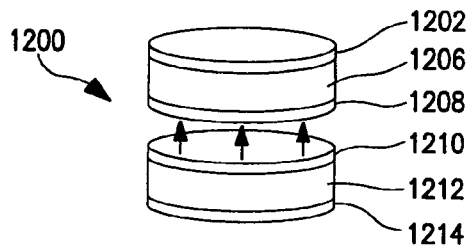
FIG. 12: is a schematic illustration of another embodiment of a thin-film filter consistent with the invention.

Another embodiment 1200 of a filter consistent with the invention is illustrated in FIG. 12. The filter 1200 includes a long-wave-pass filter 1202 deposited directly on a first surface of a substrate 1206, and a short-wave-pass filter 1208 deposited directly on a second surface of the substrate 1206. An extended blocking filter 1210, e.g. a chirped Bragg reflector as described above in connection with FIGS. 8A and 8B, is deposited directly on a first surface of a second substrate 1212, and an anti-reflection coating 1214 is deposited directly on a second surface of the substrate 1212. The filter may be completed by affixing the top of the extended blocking filter 1210 to the bottom of the short-wave-pass filter 1208, e.g. using an adhesive or incorporating both substrates into a supporting ring with an air gap between them.

Figure 13:
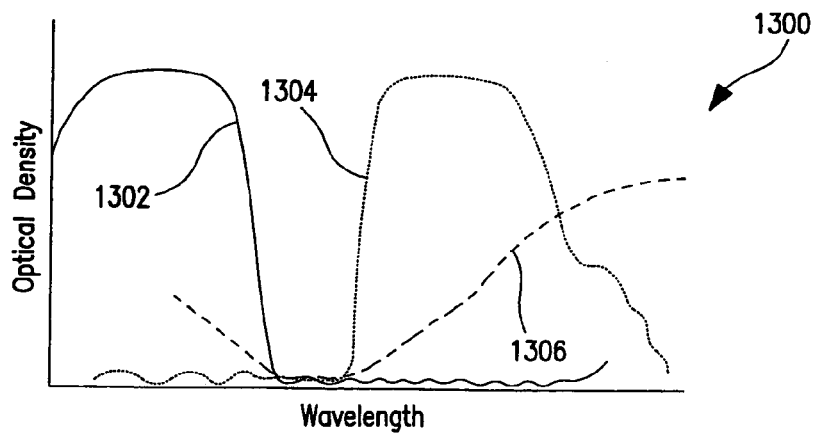
FIG. 13: illustrates optical density v. wavelength of the filter illustrated in FIG. 12.

FIG. 13 provides an illustration 1300 of optical density (on a logarithm scale) vs. wavelength for the filter 1200. Plot 1302 illustrates the optical density vs. wavelength for the long-wave-pass filter 1202, plot 1304 illustrates optical density vs. wavelength for the short-wave-pass filter 1208, and plot 1306 illustrates optical density vs. wavelength for the extended blocking filter 1210. As shown, this configuration also allows for high out-of-band rejection for both long and short wavelengths that are not of interest in the application.

Figure 14:
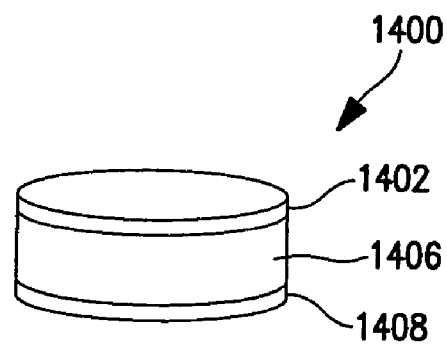
FIG. 14: is a schematic illustration of another embodiment of a thin-film filter consistent with the invention.
Figure 15:
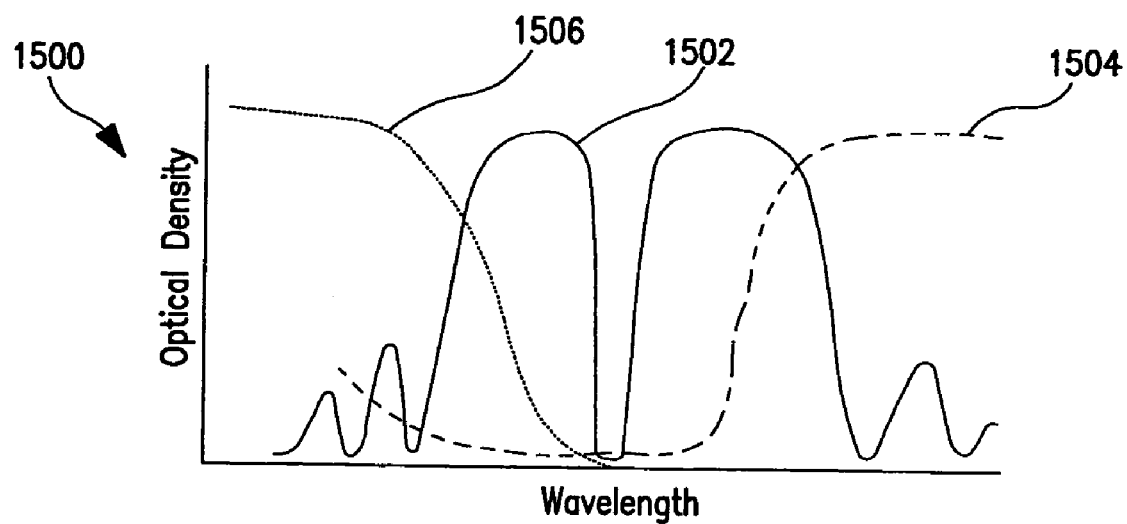
FIG. 15: illustrates optical density v. wavelength of the filter illustrated in FIG. 14.
Figure 16:
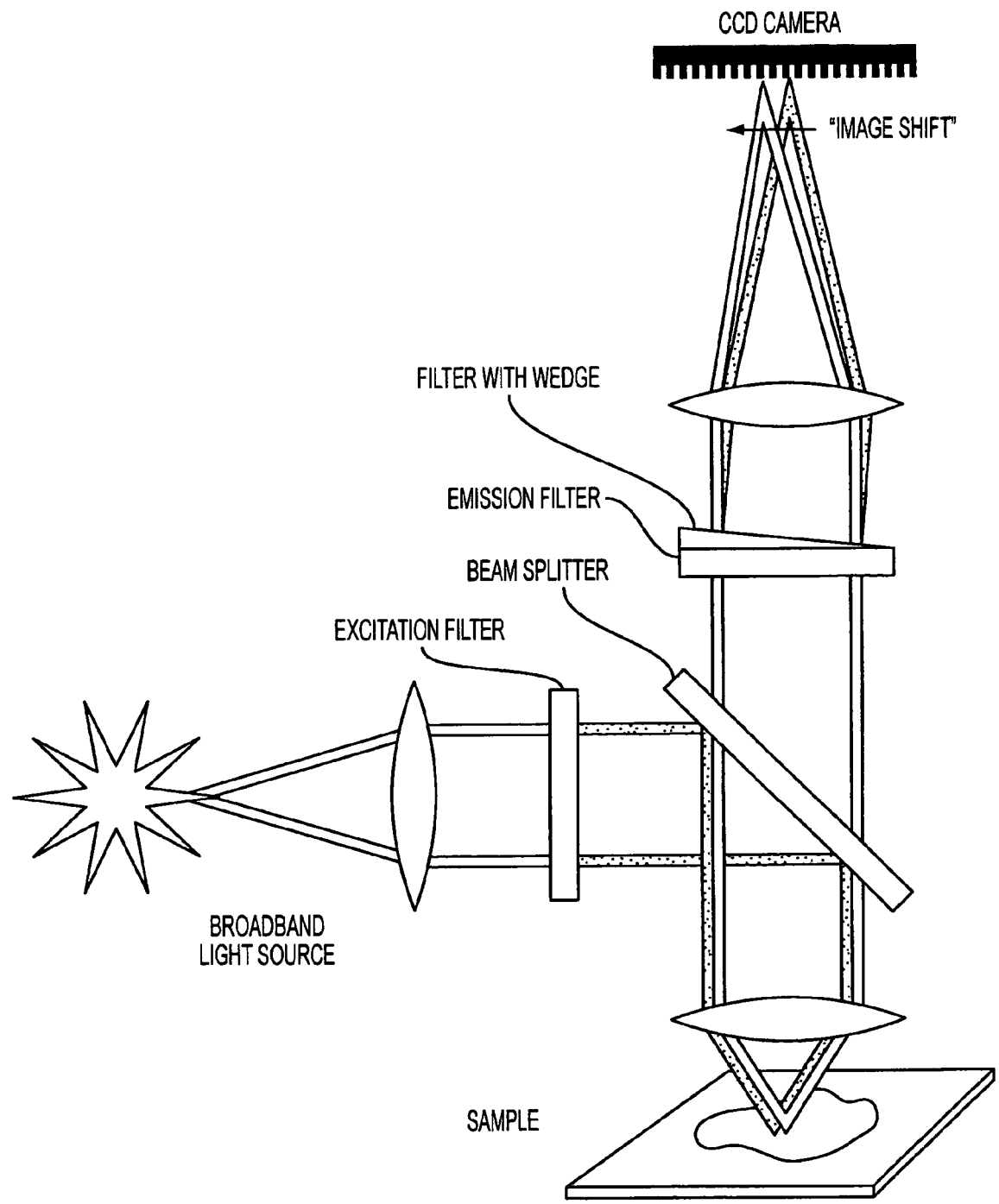
FIG. 16: illustrates a conventional fluorescence imaging system in which image shift occurs.
Figure 17:
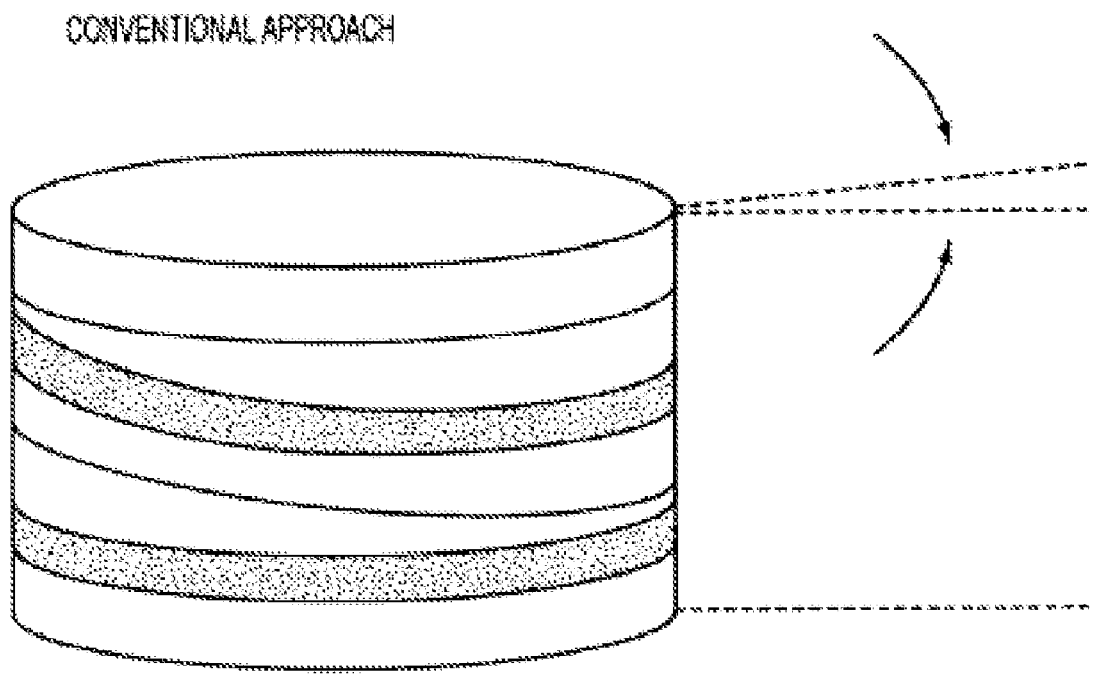
FIG. 17: illustrates a conventional filter used in a conventional fluorescence imaging system.

Another embodiment 1400 of a filter consistent with the invention is illustrated in FIG. 14. The filter 1400 includes a narrow bandpass filter 1402 deposited directly on a first surface of an ultraviolet (UV) light absorbing glass substrate 1406, and a short-wave-pass filter 1408 deposited directly on a second surface of the substrate 1406. FIG. 15 provides an illustration 1500 of optical density vs. wavelength for the filter 1400. Plot 1502 illustrates the optical density vs. wavelength for the narrow bandpass filter 1402, plot 1504 illustrates optical density vs. wavelength for the short-wave-pass filter 1408, and plot 1506 illustrates optical density vs. wavelength for the UV absorbing glass substrate. As shown, the UV absorbing glass substrate provides high out-of-band rejection for both long and short wavelengths that are not of interest in the application.

Those skilled in the art will also recognize that a filter consistent with the invention may also be constructed using multiple deposition systems. For example, the edge filters may be hard coating filters formed using a sputtering deposition system and the extended blocking and/or anti-reflection coatings (as shown in FIG. 12 for example) may be deposited using an evaporator deposition system. Also, one part of a filter, such as the short-wave-pass filter portion, may be deposited using a sputtering system, with the rest of the filter being deposited in an evaporation system.

Emitter filters, consistent with embodiments of the present invention, provide superior image shift performance due to the ability to readily control and minimize the beam deviation caused by these filters. In the simple, single substrate design of the filters consistent with embodiments of the present invention, the parallelism, or wedge angle, of the overall filter may be determined by the wedge angle of the single substrate. Thus, the wedge angle may be readily controlled and may be limited to a strict minimum, for example, by using the standard techniques of grinding and polishing glass substrates that are known to those skilled in the art. In particular, the beam deviation angle $\beta$ of a light ray incident at an angle $\theta$, on a wedged substrate with wedge angle $\alpha$ (assumed to be small) is given by $$\beta = \sin^{-1}\left(n\sin\left[\alpha + \sin^{-1}\left\{\frac{\sin\theta}{n}\right\}\right]\right) - \theta - \alpha,$$

where n is the index of refraction of the substrate. For light incident at normal incidence ($\theta=0$), it can be seen that the beam deviation is given by the simpler expression $$\beta = (n-1)\alpha.$$

This simpler expression is also approximately true for light incident near normal incidence, for example at an angle of about 5 degrees, which is common for emitter filters in fluorescence microscopes.

Figure 18:
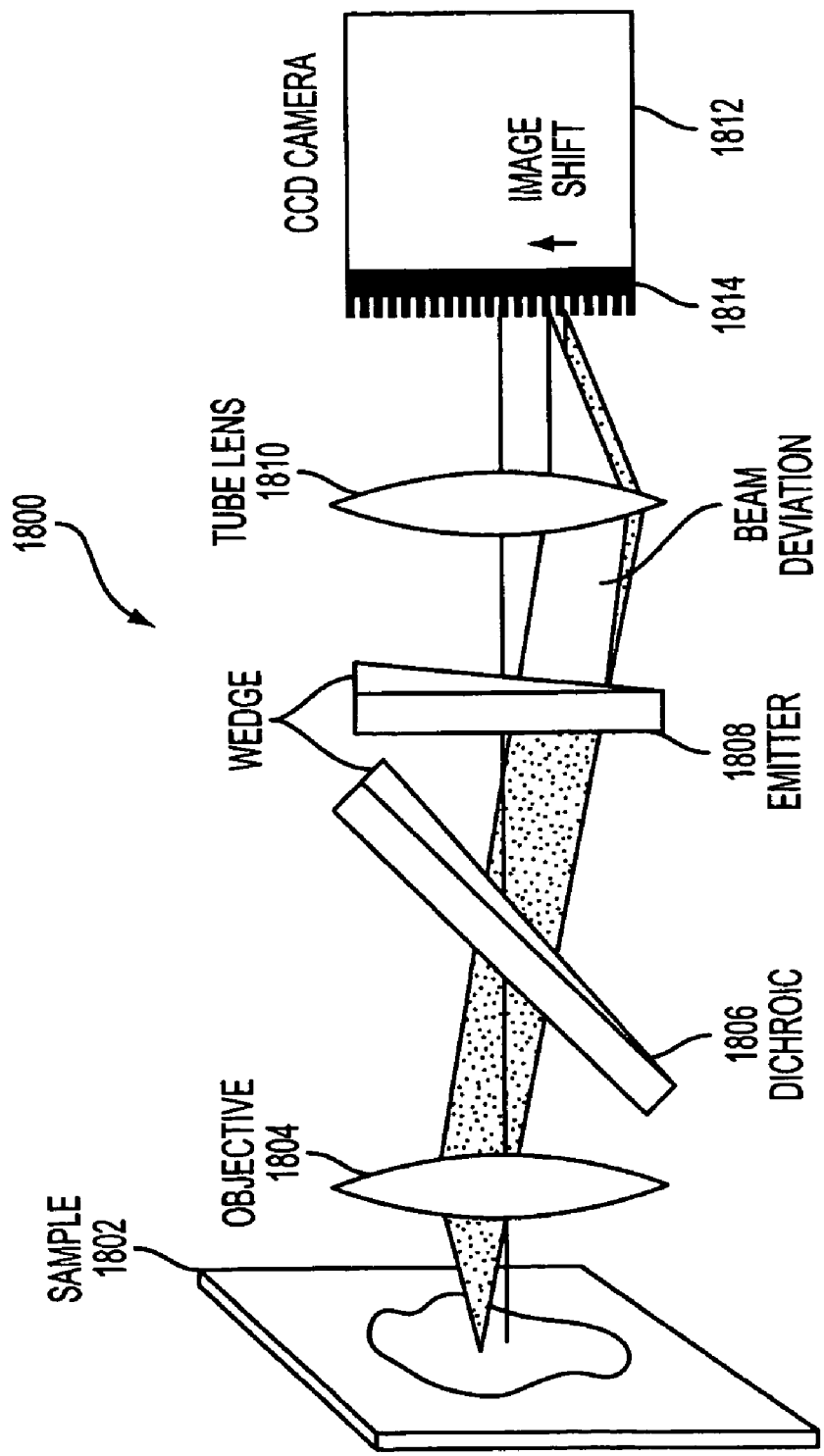
FIG. 18: illustrates a fluorescence imaging system in which image shift is caused by the wedge angle of each filter in a filter set.
Figure 19:
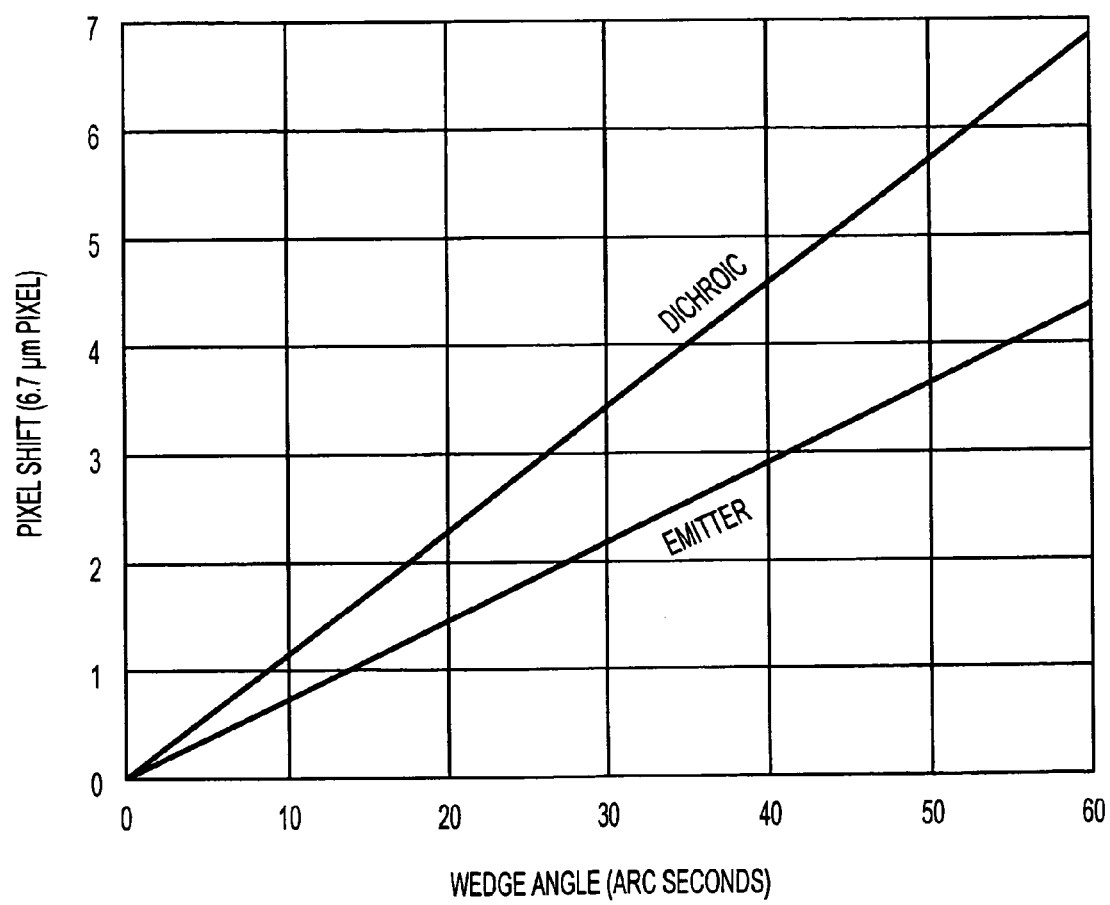
FIG. 19: illustrates pixel shift as a function of wedge angle of the dichroic and emitter filters.

The beam deviation may be related to image shift on the detector (e.g., the camera or CCD sensor), as shown in FIGS. 18 and 19. In one type of fluorescence microscopes, as shown in FIG. 18, the optical imaging system 1800 may include a microscope objective 1802 between the sample 1804 and the optical filters 1806, 1808, which images the object to infinity. A tube lens 1810 between the filters 1806, 1808 and the camera or CCD sensor 1812 takes the image at infinity and images it onto the camera or CCD sensor plane 1814. Tube lens focal lengths may vary between about 160 and 200 mm, although in some systems the tube lens focal length can vary between about 150 and 250 mm. The net beam deviation may be caused by both the emitter filter 1808 and the beamsplitter 1806, and may depend on the relative orientation (in terms of rotation about the optical axis) of the two individual beam deviations caused by these filters 1806, 1808.

Assuming the filters 1806, 1808 are randomly oriented, the worst-case net beam deviation is the sum of the two individual beam deviations. For a given net beam deviation (e.g., less than 1 degree), the image shift at the camera or CCD sensor 1812 is the beam deviation multiplied by the focal length of the tube lens 1810. For systems that utilize CCD sensors, this image shift may be measured in terms of the number of pixels of shift, where the unit of lateral shift is the center-to-center pixel spacing on the CCD sensor 1812. For example, a common pixel spacing, s, in high-performance monochrome cameras is 6.7 µm. Pixel shift is given by $$\text{Pixel Shift} = \frac{f_{tl} \cdot \beta}{s}$$

where $f_{tl}$ is the tube lens focal length.

The graph in FIG. 19 illustrates the pixel shift in one embodiment of an imaging system, which results from an emitter filter with a given wedge angle and also from a dichroic beamsplitter with a given wedge angle. Assuming a 200 mm focal length tube lens and a 6.7 µm pixel spacing, the above equations indicate that for an emitter filter (at or near normal incidence), there is a pixel shift of about 0.072 pixels per arc second of wedge angle, whereas for a dichroic beamsplitter (at 45 degrees angle of incidence), the pixel shift is about 0.12 pixels per arc second of wedge angle. Therefore, assuming a worst-case relative orientation of beam deviations from the two filters, one can ensure that there is less than ±1 pixel of relative shift when changing from one filter set to another so long as the wedge angles of the filters obey the relation $$0.072\alpha_{Em} + 0.12\alpha_{Di} < \pm 1 \text{ pixel } (\alpha \text{ measured in arc seconds})$$

where $\alpha_{Em}$ is the wedge angle of the emitter filter and $\alpha_{Di}$ is the wedge angle of the dichroic beamsplitter (measured in arc seconds).

From the above equation, assuming the dichroic beamsplitters are perfect (have zero relative variation in wedge angle from filter to filter), in one example, if the emitter wedge angle is kept below 14 arc seconds, there will be less than 1 pixel of relative image shift from filter set to filter set. As another example, if the substrates for the dichroic beamsplitters and the emitters are specified to have the same wedge angle tolerance, then each should be limited to 5.2 arc seconds to maintain sub-pixel image shift performance.

If the variation of the beam deviation angles (and orientations) among the filters in the filter sets is kept small according to the equation above, a sub-pixel-shift performance may be achieved. Thus, the relative pixel shift may be minimized even if all filters in the set have large beam deviation angle.

There is thus provided a thin film filter that is durable and provides high performance filtering of selected signals, especially in connection with fluorescence spectroscopy applications. The filter is constructed using "hard coatings" to ensure durability and eliminate the need for separate systems for protecting the filter from environmental conditions. The hard coatings also allow the wedge angled to be controlled to minimize beam deviation, for example, when switching between filter sets, thereby minimizing relative pixel shift. The embodiments which have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An emission filter for use in a spectroscopy system comprising a beamsplitter having a first wedge angle $\alpha_{Di}$, said emission filter comprising:
    a substrate;
    a first thin-film interference filter disposed directly on said substrate, said first interference filter comprising a first plurality of hard coating thin film layers of alternating high and low index of refraction and being configured for transmitting a first range of wavelengths;
    a second thin-film interference filter disposed directly on a second surface of said substrate opposed to said first surface, said second interference filter comprising a second plurality of hard coating thin film layers of alternating high and low index of refraction and being configured for transmitting a second range of wavelengths, said second range of wavelengths being different from said first range of wavelengths, said first and second thin-film interference filters, thereby establishing a bandpass transmission characteristic for said filter; and
    wherein said emission filter has a second wedge angle $\alpha_{Em}$ in accordance with the equation $0.072\alpha_{Em} + 0.12\alpha_{Di} < \pm 1$ pixel.

2. The emission filter according to claim 1, wherein a passband of wavelengths for said bandpass transmission characteristic is between 150 nm to 1200 nm.

3. The emission filter according to claim 1, wherein a passband of wavelengths for said bandpass transmission characteristic is between about 400 to 700 nm.

4. The emission filter according to claim 1, wherein said substrate comprises material selected from the group consisting of: colored or absorbing glass, transparent glass, and ultraviolet (UV) absorbing glass.

5. The emission filter according to claim 1, wherein said hard coating thin film layers comprise material selected from the group consisting of: $SiO_2$, $Ta_2O_5$, $Nb_2O_5$, $HfO_2$, and $TiO_2$.

6. The emission filter according to claim 1 wherein said second wedge angle $\alpha_{Em}$ is less than about 14 arc seconds.

7. The emission filter according to claim 1 wherein said first and second wedge angles $\alpha_{Di}$, $\alpha_{Em}$ are smaller than about 5.2 arc seconds.

8. A filter set for use in a spectroscopy system, said filter set comprising:
    an emission filter having a first wedge angle $\alpha_{Em}$, wherein said emission filter comprises:
    a substrate;
    a first thin-film interference filter disposed directly on said substrate, said first interference filter comprising a first plurality of hard coating thin film layers of alternating high and low index of refraction and being configured for transmitting a first range of wavelengths; and
    a second thin-film interference filter disposed directly on a second surface of said substrate opposed to said first surface, said second interference filter comprising a second plurality of hard coating thin film layers of alternating high and low index of refraction and being configured for transmitting a second range of wavelengths, said second range of wavelengths being different from said first range of wavelengths, said first and second thin-film interference filters, thereby establishing a bandpass transmission characteristic for said filter; and
    a dichroic beamsplitter having a second wedge angle $\alpha_{Di}$, wherein said first and second wedge angles $\alpha_{Em}$, $\alpha_{Em}$ are determined according to the equation $0.0072\alpha_{Em} + 0.12\alpha_{Di} < \pm 1$ pixel.

9. The filter set according to claim 8 wherein said first wedge angle $\alpha_{Em}$ is less than about 14 arc seconds.

10. The filter set according to claim 8 wherein said first and second wedge angles $\alpha_{Em}$, $\alpha_{Di}$ are smaller than about 5.2 arc seconds.

11. A method of selecting a band of wavelengths from light in a fluorescence spectroscopy system, said method comprising:
    providing an optical filter comprising a substrate, a first thin-film interference filter disposed directly on a first surface of said substrate, and a second thin-film interference filter disposed directly on a second surface of said substrate opposed to said first surface, said first thin-film interference filter comprising a first plurality of hard coating thin film layers of alternating high and low index of refraction and being configured for transmitting a first range of wavelengths, said second interference filter comprising a second plurality of hard coating thin film layers of alternating high and low index of refraction and being configured for transmitting a second range of wavelengths different from said first range of wavelengths, wherein:
    said first and second thin-film interference filters thereby establish a bandpass characteristic for said optical filter for transmitting said band of wavelengths, said passband being defined by first and second wavelength edge portions;

said optical filter exhibits transmission exceeding 90% over the spectral width of the passband, and a change in transmission of 5 decades over one of the first and second wavelength edge portions corresponding to a wavelength change of less than 1%; and imparting said light on said optical filter.

12. A method according to claim 11, wherein said first range of wavelengths comprises wavelengths longer than said second range of wavelengths, and wherein said light is imparted on said first thin-film interference filter.

13. A method according to claim 11, wherein said first and second pluralities of hard coating thin film layers comprise material selected from the group consisting of: $SiO_2$, $Ta_2O_5$, $Nb_2O_5$, $HfO_2$, and $TiO_2$.

14. An optical filter comprising:
a substrate;
a first thin-film interference filter disposed directly on a first surface of said substrate, said first interference filter being configured for transmitting a first range of wavelengths and comprising at least 30 hard coating non-quarter wave first filter layers of alternating high and low index of refraction, whereby there is no wavelength in said first range of wavelengths for which said at least 30 hard coating non-quarter wave first filter layers is one-quarter of a wavelength in thickness; and
a second thin-film interference filter disposed directly on a second surface of said substrate opposed to said first surface, said second interference filter being configured for transmitting a second range of wavelengths and comprising at least 30 hard coating non-quarter wave second filter layers of alternating high and low index of refraction, whereby there is no wavelength in said second range of wavelengths for which said at least 30 hard coating non-quarter wave second filter layers is one-quarter of a wavelength in thickness; wherein
said first and second thin-film interference filters thereby establish a bandpass characteristic for said optical filter, said passband being defined by first and second wavelength edge portions; and
said optical filter exhibits transmission exceeding 90% over the spectral width of the passband, and a change in transmission of 5 decades over one of the first and second wavelength edge portions corresponding to a wavelength change of less than 1%.

15. A filter according to claim 14, wherein said second range of wavelengths is different from said first range of wavelengths, said first and second thin-film interference filters thereby establishing a bandpass transmission characteristic for said filter.

16. A filter according to claim 14, wherein said first and second filter layers comprise a material selected from the group consisting of; $SiO_2$, $Ta_2O_5$, $Nb_2O_5$, $HfO_2$, and $TiO_2$.

17. An optical filter, comprising:
a substrate;
a bandpass filter directly on the surface of a first side of said substrate, wherein said bandpass filter comprises a plurality of alternating first hard coating layers and second hard coating layers provided on the substrate, the first hard coating layers having a first refractive index and the second hard coating layers having a second refractive index, the first refractive index being greater than the second refractive index;
an edge filter coating directly on a second surface side of said substrate, said second surface side being opposite to said first surface side;
wherein the optical filter has a transmission characteristic as a function of wavelength, the transmission characteristic having a passband defined by first and second wavelength edge portions of the transmission characteristic, the passband having a spectral width, a transmission of the optical filter exceeding 90% over the spectral width of the passband, and a change in the transmission of the optical filter of 5 decades over one of the first and second edge portions corresponds to a wavelength change of less than 1%.

18. An optical filter in accordance with claim 17, wherein the optical filter has an optical density greater than 4 over a range of wavelengths outside of the spectral width of the passband.

19. An optical filter in accordance with claim 18, wherein each wavelength within the range of wavelengths is less than 1200 nm.

20. An optical filter in accordance with claim 18, wherein the range of wavelengths includes a wavelength of 1200 nm.

21. An optical filter in accordance with claim 17, wherein each of the first hard coating layers includes $Ta_2O_5$ and each of the second hard coating layers includes $SiO_2$.

22. An optical filter in accordance with claim 17, further comprising a Bragg reflector layer provided on the plurality of alternating first and second hard coating layers.

23. An optical filter in accordance with claim 17, wherein the spectral width is substantially equal to 40 nm.

24. An optical filter in accordance with claim 17, wherein a total number of the plurality of first and second hard coating layers is at least 30.

25. An optical filter in accordance with claim 17, wherein each of the first hard coating layers includes a material selected from $Ta_2O_5$, $TiO_2$, $Nb_2O_5$, and $HfO_2$.

26. An optical filter in accordance with claim 25, wherein each of the second hard coating layers includes $SiO_2$.

27. An optical filter, comprising:
a substrate;
a bandpass filter directly on the surface of a first side of said substrate, wherein said bandpass filter comprises a plurality of alternating first and second layers provided on the substrate, the first layers having a first refractive index and the second layers having a second refractive index, the first refractive index being greater than the second refractive index, each of the first layers including a material selected from $Ta_2O_5$, $TiO_2$, $Nb_2O_5$, and $HfO_2$, and each of the second layers including $SiO_2$; and
an edge filter coating directly on a second surface side of said substrate, said second surface side being opposite to said first surface side;
wherein the optical filter has a transmission characteristic as a function of wavelength, the transmission characteristic having a passband defined by first and second wavelength edge portions of the transmission characteristic, the passband having a spectral width, a transmission of the optical filter exceeding 90% over the spectral width of the passband, and a change in the transmission of the optical filter of 5 decades over one of the first and second edge portions corresponds to a wavelength change of less than 1%.

28. An optical filter in accordance with claim 27, wherein the optical filter has an optical density greater than 6 over a range of wavelengths outside of the spectral width of the passband.

29. An optical filter in accordance with claim 28, wherein each wavelength within the range of wavelengths is less than 1200 nm.

30. An optical filter in accordance with claim 28, wherein the range of wavelengths includes a wavelength of 1200 nm.

31. An optical filter in accordance with claim 27, further comprising a Bragg reflector layer provided on the plurality of alternating first an second hard coatings.

32. An optical filter in accordance with claim 27, wherein the spectral width is substantially equal to 40 nm.

33. An optical filter in accordance with claim 27, wherein a total number of the plurality of first and second layers is at least 30.

* * * * *

UNITED STATES PATENT AND TRADEMARK OFFICE
CERTIFICATE OF CORRECTION

PATENT NO. : 7,411,679 B2
APPLICATION NO. : 10/953483
DATED : August 12, 2008
INVENTOR(S) : Erdogan et al.

It is certified that error appears in the above-identified patent and that said Letters Patent is hereby corrected as shown below:

In claim 8, column 18, line 38, "$\alpha_{Em}, \alpha_{Em}$" should read --$\alpha_{Em}, \alpha_{Di}$--.

In claim 8, column 18, line 39, "$0.0072\alpha_{Em}+$" should read --$0.072\alpha_{Em}+$--.

In claim 16, column 19, line 52, "of;" should read --of:--.

In claim 31, column 21, line 3, "an" should read --and--.

Signed and Sealed this

Eighteenth Day of November, 2008

JON W. DUDAS
*Director of the United States Patent and Trademark Office*